United States Patent [19]
Fichet et al.

[11] Patent Number: 5,317,609
[45] Date of Patent: May 31, 1994

[54] METHOD AND APPARATUS FOR INSTALLING FUEL RODS IN A NUCLEAR FUEL ASSEMBLY SKELETON

[75] Inventors: Claude Fichet; Roland Villaeys, both of Romans, France

[73] Assignee: Societe Franco-Belge-de Fabrication de Combustibles, Courbevoie, France

[21] Appl. No.: 53,396

[22] Filed: Apr. 28, 1993

[30] Foreign Application Priority Data

Apr. 28, 1992 [FR] France .................. 92-05231

[51] Int. Cl.$^5$ .................................. G21C 21/00
[52] U.S. Cl. .......................................... 376/261
[58] Field of Search ................... 376/261; 29/723, 906

[56] References Cited

U.S. PATENT DOCUMENTS

| | | | |
|---|---|---|---|
| 3,748,713 | 7/1973 | Tindale et al. | 376/261 |
| 4,297,776 | 11/1981 | Fogg | 376/261 |
| 4,625,396 | 12/1986 | Ahmed et al. | 376/261 |
| 4,740,351 | 4/1988 | Katsumizu et al. | 376/261 |
| 4,895,695 | 1/1990 | Schallenberger et al. | 376/261 |

FOREIGN PATENT DOCUMENTS

0017508 10/1980 European Pat. Off. .
2579359 9/1986 France .

*Primary Examiner*—Daniel D. Wasil
*Attorney, Agent, or Firm*—Pollock, Vande Sande & Priddy

[57] ABSTRACT

The apparatus enables rods to be installed in an assembly skeleton that does not include its end-fittings. The apparatus comprises reception means receiving the skeleton without end-fittings and enabling the skeleton to be interposed between a storage magazine storing rods in alignment with rod-receiving emplacements in the skeleton and with a longitudinal displacement mechanism for displacing drawbars that are terminated by rod-grasping clamps towards the magazine and away from the magazine. The apparatus also includes a cap-placing assembly interposed between the reception means and the longitudinal displacement mechanism. The cap-placing assembly has a fixed support and a removable receptacle pierced with cap-retaining housings in an array that reproduces the array of rod-receiving emplacements. The shape of the caps being such that they fit over the clamps of the drawbars while the drawbars are moving towards the magazine.

13 Claims, 6 Drawing Sheets

METHOD AND APPARATUS FOR INSTALLING FUEL RODS IN A NUCLEAR FUEL ASSEMBLY SKELETON

BACKGROUND OF THE INVENTION

The present invention relates to installing fuel rods in a nuclear fuel assembly skeleton, and it is particularly applicable to fuel assemblies in which the skeleton includes guide tubes interconnecting removable end fittings and carrying grids that delimit cells distributed at the nodes of a regular array and designed to receive the rods.

Such assemblies are used in nuclear reactors that are cooled and moderated by water, in particular by pressurized water.

An apparatus is already known for installing fuel rods in such a skeleton, of the type which comprises receiving means for receiving a skeleton without end nozzles, interposed between a magazine for storing fuel rods in alignment with locations in the skeleton for receiving the rods, and a displacement mechanism for displacing pull bars longitudinally towards the magazine and away from the magazine, the pull rods being terminated by clamps for grasping the rods to be inserted in the skeleton.

This applies in particular when the cells in the grids are distributed in a square array, with the displacement mechanism often being provided with the same number of pull bars as there are cells in a layer and enabling an entire layer of rods to be installed simultaneously in the skeleton. After the rods in one layer have been inserted, the mechanism is displaced transversely relative to the layer through a distance equal to the pitch between layers and is used to load a new layer of rods.

The shape of the clamps on the pull bars is such that, while they are being displaced towards the magazine through the grids, they run the risk of damaging the springs and/or the projections provided on the plates that constitute the grids for the purpose of holding the rods in place.

To avoid this risk, it is common practice to place caps having an externally tapered shape on the clamps before inserting the pull bars into the skeleton. The caps are removed when the clamps are in an intermediate position between the outlets from the skeleton and the magazine.

At present, these operations are performed manually. They are lengthy, particularly the operation of installing the caps. They require an operator to remain in the vicinity of the fuel rods. Unfortunately, greater and greater use is being made of rods that contain reprocessed fuel and/or plutonium, thereby running the risk of irradiating the operators.

SUMMARY OF THE INVENTION

It is an object of the present invention to provide rodling apparatus that satisfies practical requirements better than prior art apparatuses, and in particular that eliminate any need for manual placement of the caps on the clamps.

To this end, the invention provides apparatus of the kind defined above, further comprising a cap-placing assembly interposed between the skeleton-receiving means and the displacement mechanism, the assembly having a support fixed to these means and a removable plate that is formed with cap-retaining housings disposed in an array that reproduces the array of rod locations, the shape of the caps being such that the clamps, when closed, engage inside the caps when the pull bars are moved forwardly toward the magazine.

This disposition makes it possible to load the caps into the removable plate in a zone that is protected against radiation. The manual operation that remains necessary consists merely in fixing the plate or the receptacle that includes the plate on the fixed support prior to installing the rods of an assembly, and then in removing it once empty in order to replace it with another that is full, after the rods have been installed.

In an advantageous embodiment, making it possible to further reduce the exposure time of an operator, the apparatus further includes a cap-removing assembly comprising a frame interposed between the skeleton-receiving means and the magazine, having a frame carrying retaining jaws that are displaceable transversely to the displacement direction of the pull bars between a position in which they hold at least some of the caps and a position in which they release the caps.

Such unit makes it possible to retain the terminal caps of a set of pull bars (e.g corresponding to a layer of rods) and to remove the caps, by slightly pulling the pull bars back and then releasing the caps. This can be done merely by displacing the frame transversely to the direction of the pull bars in order to leave room for the pull bars to pass, and to enable the clamps that terminate them to advance and grasp rods placed in the magazine.

The invention also provides a method suitable for being implemented with the above-defined apparatus, comprising the steps of placing a skeleton without end nozzles horizontally between a storage magazine that stores rods in alignment with rod-receiving emplacements in the skeleton and a mechanism for longitudinally displacing pull bars terminated by rod-grasping clamps towards the magazine and away from the magazine; passing the pull bars through the skeleton up to the magazine and grasping respective rods; and pulling the rods into the skeleton. The method is characterized in that caps are loaded, at a distance from the magazine, into housings of a receptacle, the housings being distributed in the same array as the rods; the receptacle is interposed between the displacement mechanism and the skeleton; the pull bars are advanced for the clamps to be engaged inside the caps as they pass through the receptacle prior to passing through the skeleton; and on leaving the skeleton the caps are removed without manual intervention prior to bringing the clamps up to the magazine.

The invention will be better understood on reading the following description of a particular embodiment given by way of example.

DESCRIPTION OF PREFERRED EMBODIMENTS

Figure 1:
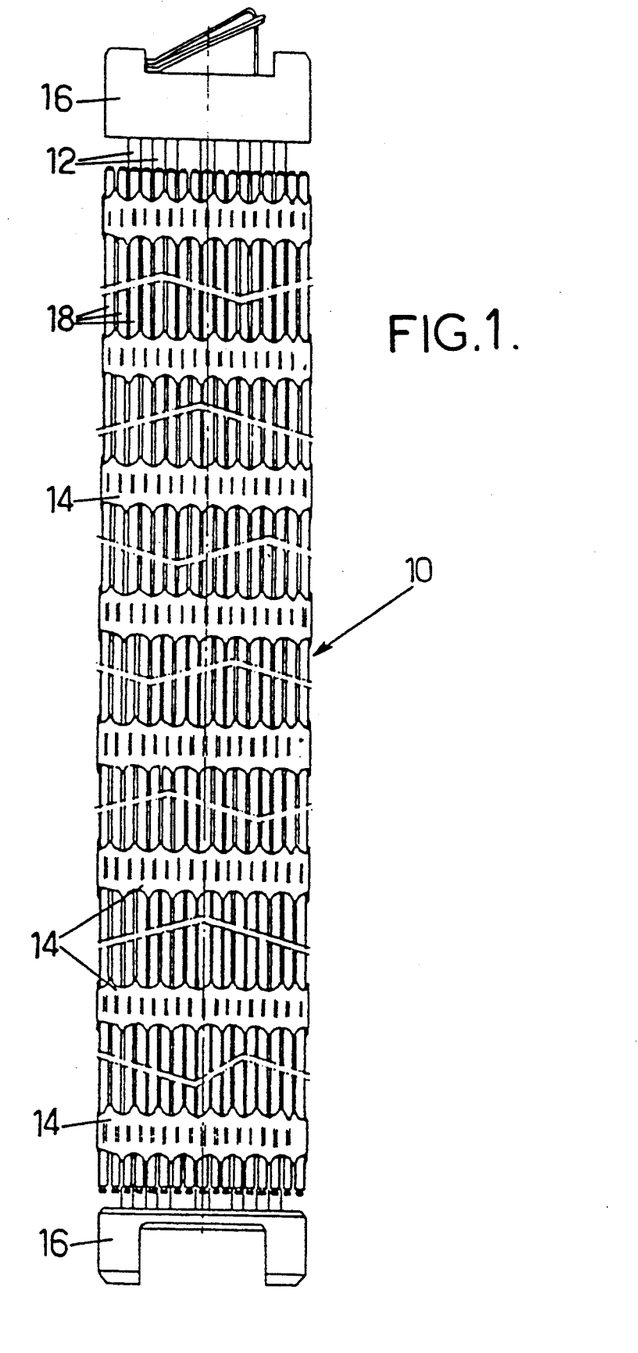
FIG. 1 is a schematic elevation view of a fuel assembly in which rods can be installed by using the invention.

The apparatus described below is applicable, in particular, to installing fuel rods in a nuclear fuel assembly of the kind described in French Patent No. 88 06860, to which reference may be made. Only a few indications on the structure of the assembly are therefore given. The assembly 20 comprises a skeleton made up of guide tubes 12, spacing grids 14 carried by the guide tubes 12, and terminal end nozzles 16. The grids are constituted by two mutually crossed sets of plates that are welded together at their crosspoints, thereby defining cells for receiving rods 18, distributed at the nodal points of a square array. The guide tubes 12 replace the fuel rods at some of the nodes of the array.

To make up such a fuel assembly, the skeleton has its end nozzles removed. The rods are then pulled along the assembly, generally layer by layer, although it would also be possible to pull them through in other groups.

Figure 2:
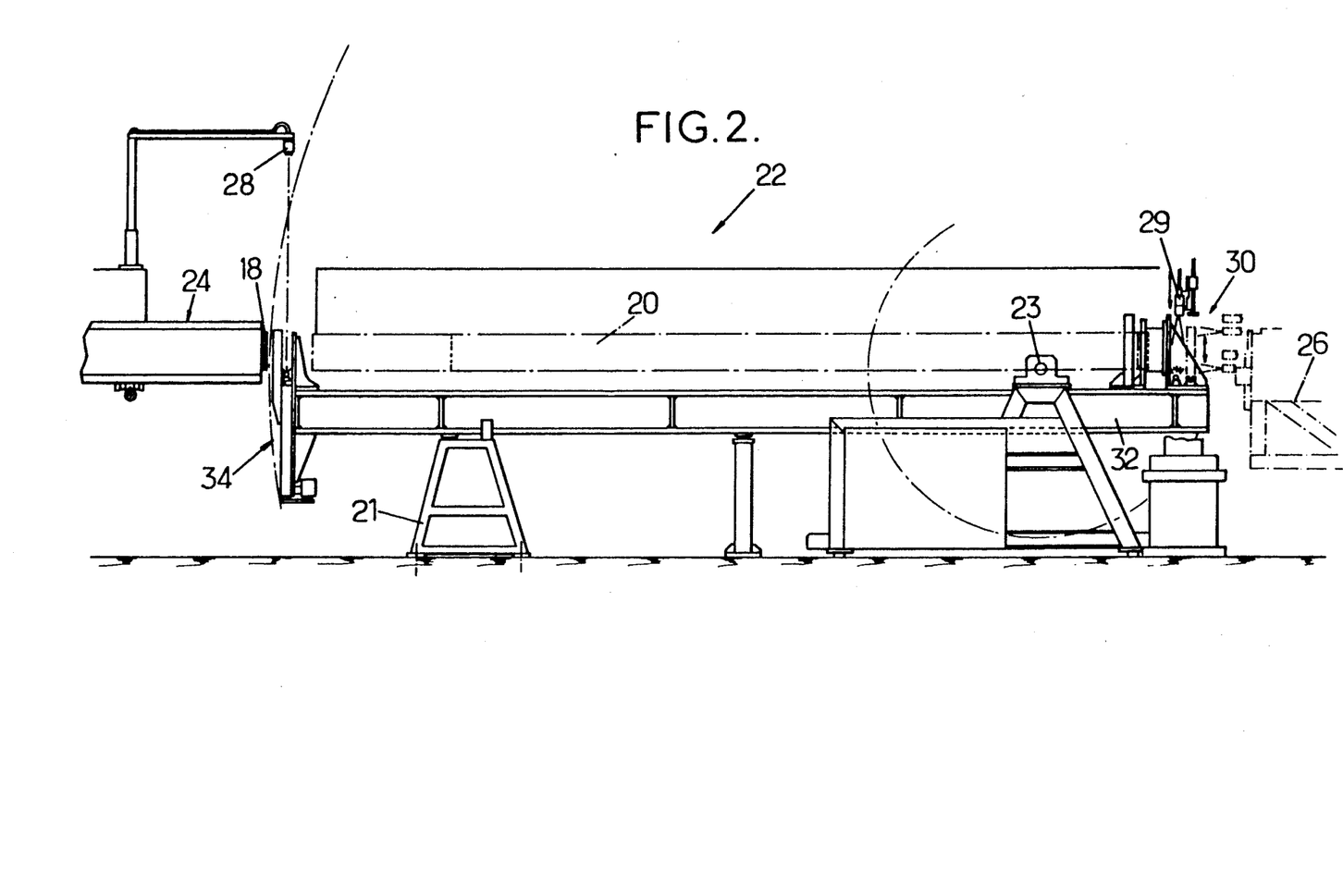
FIG. 2 is a schematic elevation view showing the general structure of the rod-installing apparatus.

The rod-installing apparatus shown in FIG. 2 serves to load rods into a skeleton 20 that is without its end nozzles.

The apparatus comprises a stand 21 which carries means 22 for receiving the skeleton 20, which means are constituted by a bench that can tilt on the stand about an axis 23 between a horizontal position as shown in FIG. 2 and a vertical position from which the fuel assembly is taken up for handling purposes.

When horizontal, the bench lies between a rod storage magazine 24 in which the rods are stored in an array that corresponds to the array that the rods are to occupy in the skeleton, and a displacement mechanism 26 for displacing pull bars horizontally. The mechanism is frequently carried by a carriage which enables the pull bars to be displaced longitudinally between a position in which an end clamp on each pull bar lies beyond the bench 22 and a position in which the clamps reach the plugs of the rods 18 that project from the magazine 24. When, as is usually the case, the mechanism 26 is designed to load an entire layer of rods at a time, it includes the same number of pull bars as the maximum number of rods that may exist in a layer, and it enables the pull bars to be displaced vertically so as to bring them into line with each of the layers in succession. Camera means are generally provided to enable the operation of the apparatus to be monitored remotely. FIG. 2 shows such means constituted by a camera 28 placed above the end of the magazine and making it possible to verify that the caps have been removed and that the rods have been grasped properly, and a second camera 29 which makes it possible to monitor that the caps have been engaged and the pull bars have been inserted.

The apparatus of the invention also includes a cap-placing assembly 30 interposed between the skeleton-receiving means and the displacement mechanism 26. In the embodiment as shown, this cap-placing assembly is carried by a beam 32 belonging to the tilting bench 22. The apparatus also includes a cap-removing assembly 34 also fixed to the beam 32.

Cap-Placing Assembly

The cap-placing assembly shown in FIGS. 3 to 6 comprises a fixed support 36 and a removable receptacle 42.

Figure 3:
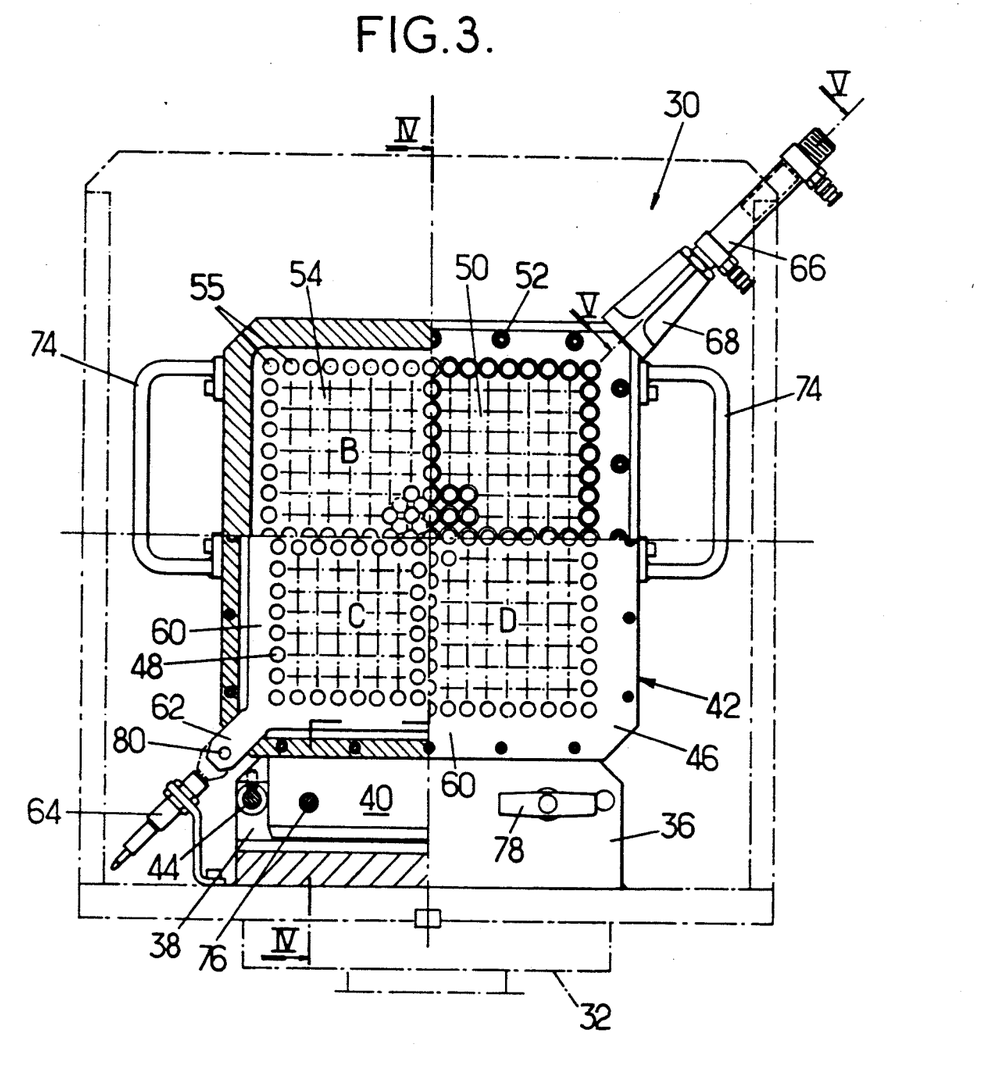
FIG. 3 shows a cap-placing assembly suitable for use in the apparatus of FIG. 2, as seen from the right hand side of FIG. 2, with zones referenced B, C, and D being in cross-section on lines B, C, and D in FIG. 4.

The fixed support 36 is in of a base having a reinforcing bracket and a sole plate fixed to the beam 32. A transverse groove 38 is formed in the base for temporarily fixing to a lug 40 belonging to a removable receptacle 42. Two wheels 44 placed at the two ends of the groove 38 hold the lug 40 laterally (FIG. 3).

Figures 4, 5, 6, 9, 10:
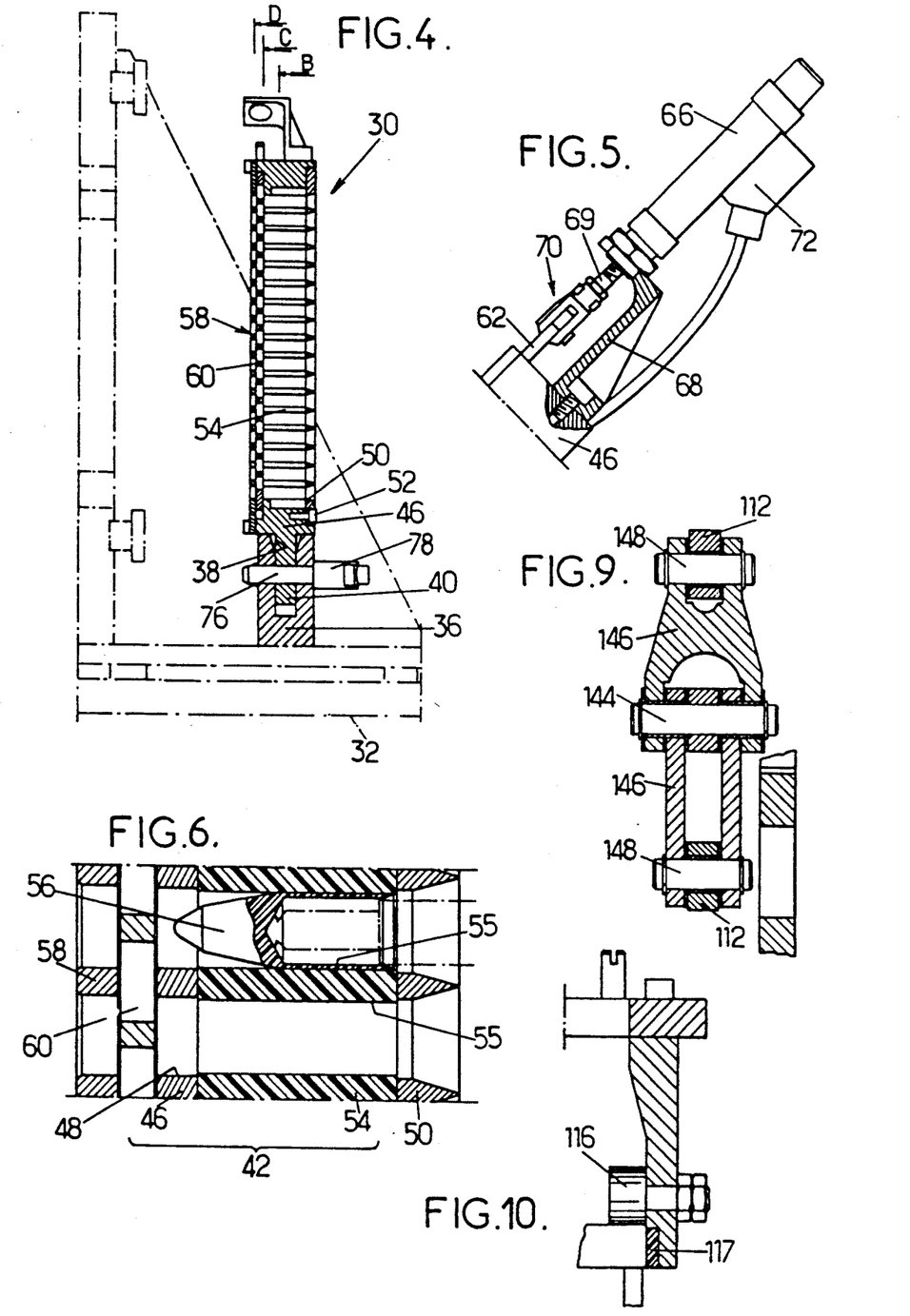
FIG. 4 shows the cap-placing assembly in cross-section along line IV—IV of FIG. 3.
FIG. 5 is a detail view in cross-section on line V—V of FIG. 3.
FIG. 6 shows a detail of FIG. 4 on an enlarged scale.
FIG. 9 is a lefthand view of the mechanism for controlling the jaws in the assembly shown in FIGS. 7 and 8.
FIG. 10 is a detail view on an enlarged scale, in cross-section, on line X—X of FIG. 8.

The removable receptacle 42 comprises a perforated body 46 provided with the lug 40, and in which passages 48 are provided that are distributed over the same array as the rods. The perforated body has countersunk holes and fixing flanges for a closure plate 50 that is held in place by screws 52, for example. The body 46 and the closure plate hold captive a grid 54 formed with housings 55 for receiving caps 56 (only one of which is shown in FIG. 6). A backing plate 58, likewise perforated, is fixed to the front of the body 46 and cooperates with the body to define a passage for receiving a moving plate 60.

The grid 54, which is advantageously made of plastic material, is formed with the parallel housings 55. The diameter of the housings and the plastic material are chosen so that the grid is capable of retaining the caps 56 by friction. The length of the caps is less than the total thickness of the body 46 and of the grid 54. The leading ends of the caps are tapered. A clamp-receiving blind hole is formed in each cap.

The purpose of the moving plate 60 is to prevent the caps 56 being expelled by the clamps of the pull bars when the latter penetrate into the caps 56, and to allow the caps to pass when the pull bars are to be inserted in the frame through the receptacle. For this purpose, the moving plate 60 is formed with holes distributed in an array identical to that of the rods in the skeleton and it is displaceable, in a direction at 45° to the layers, between a locking position as shown in FIGS. 3, 4, and 5 (where each hole through the grid is situated halfway between two passages 48 through the body), and a position where the caps are free to pass. The passage in the perforated body 46 provides sufficient clearance for the grid to perform this displacement, as shown in FIG. 3.

The displacements of the movable plate 60 are guided and controlled by means which may be those shown in FIGS. 3 and 5. In this embodiment, two of the corners of the moving plate 60 are extended by tabs 62. FIG. 3 uses solid lines to show the position of the moving plate in which it retains the caps and chain-dotted lines to show the position of the bottom tab when the moving plate is in its position where it allows the caps to pass through. The two tabs are guided in passages provided in the perforated body. A proximity detector 64 fixed to the base 36 serves to detect the position of the moving plate.

The means shown in FIGS. 3 and 5 for displacing the movable plate comprise a double-acting actuator 66 whose cylinder is connected by a sleeve 68 to the perforated body 46 and whose rod 69 is coupled to the tab 62 via a hinged coupling 70. An end-of-stroke detector 72 may be provided to check proper operation of the actuator.

It can be seen that the removable receptacle 42 constitutes a unit that is capable of being handled and transported by means of handles 74 (FIG. 3), in particular for reloading it at a distance from the apparatus. To install it, the tongue 40 is inserted in the groove 38. The perforated body 46 is locked in place by means of pins 76 provided with handles 78 and threaded through aligned bores in the perforated body 46 and in the tongue 40.

Cap-Removing Assembly

The cap-removing assembly includes a portion fixed to the beam 32 of the tilting bench and an extractor 100 that is vertically displaceable between an active cap-removing position and a retracted position in which it releases the removed caps and allows the pull bars to pass.

Figure 7:
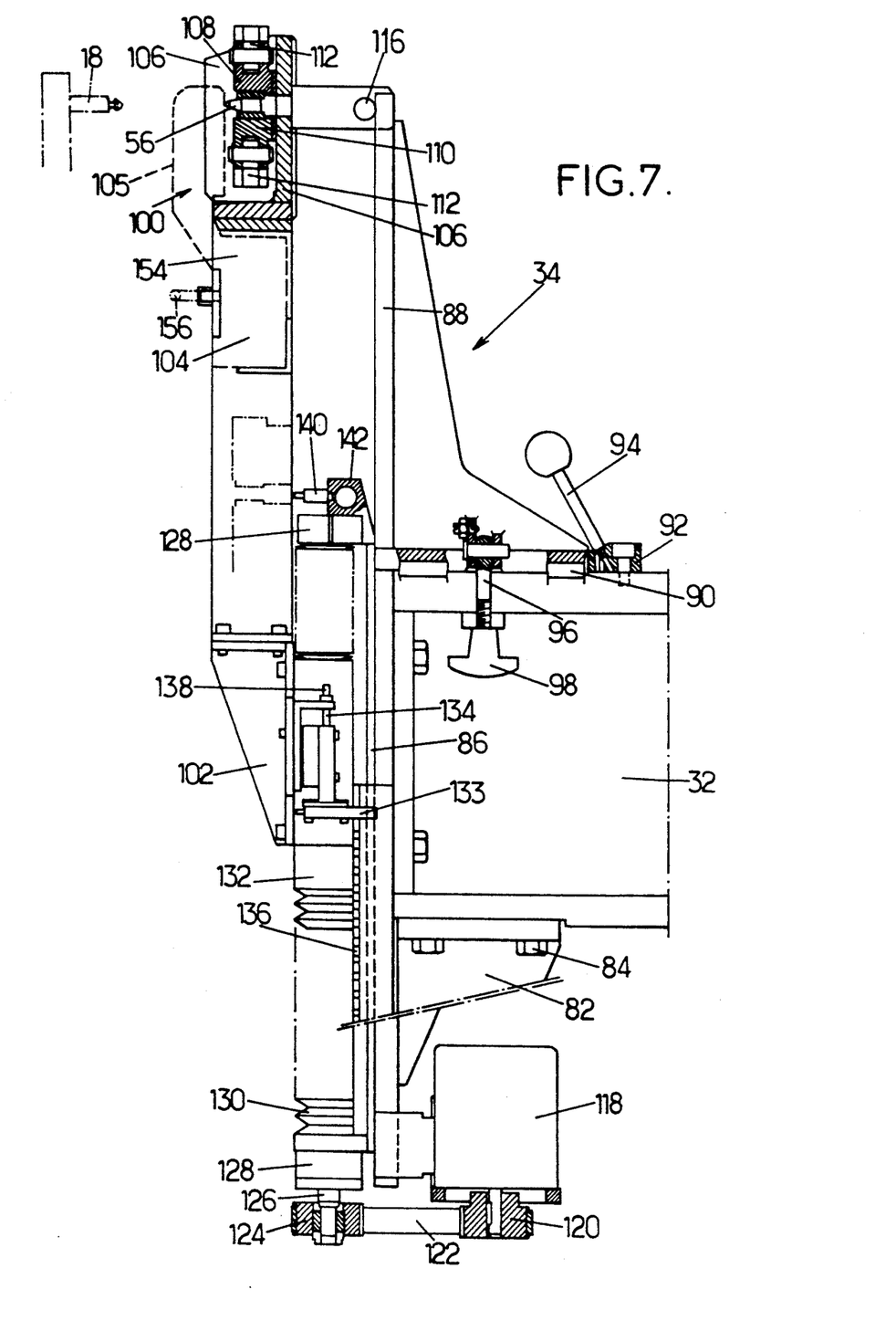
FIG. 7 is an elevation view on an enlarged scale showing a cap-removing assembly suitable for use in the apparatus of FIG. 2.
Figure 8:
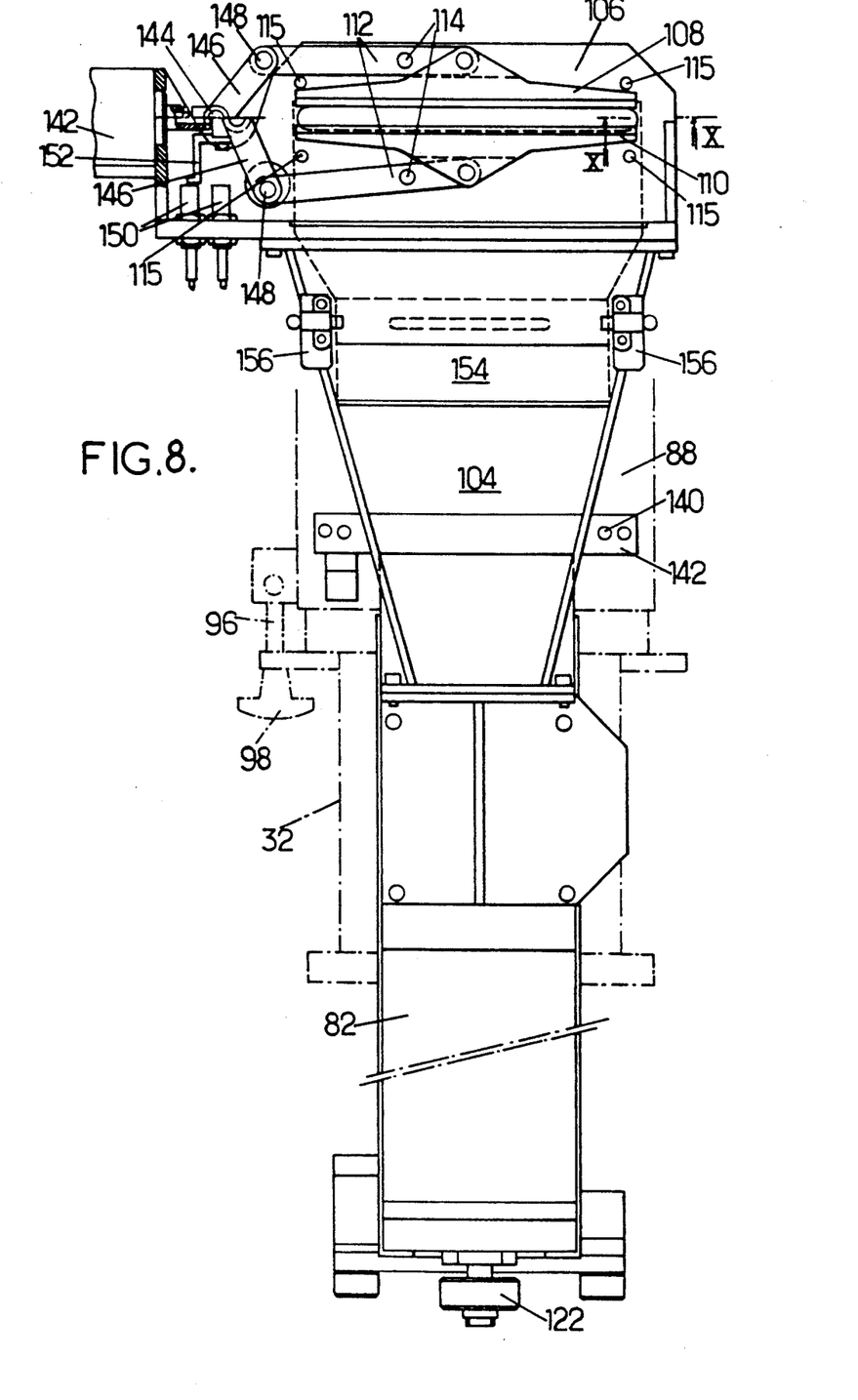
FIG. 8 is a lefthand view of the assembly shown in FIG. 7, in which a beam belonging to the skeleton-receiving means is represented in chain-dotted lines.

The fixed portion comprises a lower bracket 82 securely fixed to the bottom face of the beam 32, e.g., by screws 84, and extended upwards by a vertical plate 86. It also includes an upper bracket 88 fixed to the beam and bearing against the plate 86. The upper bracket 88 shown in FIG. 7 is centered laterally on the beam by slidable keying means including a key fixed to the beam and a groove in the bracket 88. It is forced against the plate 86 by an eccentric 92 that rotates on the beam 32 and that is actuated by a lever 94. It is held vertically by bolts 96 pivoting on the upper bracket 88 and engaged in quick-tightening internally threaded knobs 98 for bearing against a plate secured to the beam (FIG. 8).

The extractor 100 is shown in FIGS. 7 and 9 in the position it occupies while removing caps. The extractor comprises a frame made up of a plurality of parts assembled together. The frame is guided laterally by the lower and upper brackets 82 and 88. It may be regarded as comprising a vertical motion-transmitting bracket 102, an extender 104, and a jaw support 106. For example, it may be guided on the upper bracket 88 by wheels 116 that are carried by lateral tabs of the support and bear against the vertical face of the bracket and by slidable friction pads (FIG. 10).

The upper and lower jaws 108 and 110 that are vertically movable on the support are designed to engage and hold the caps of an entire layer of pull bars. They are carried by respective levers 112 each rotating about an axis 114 fixed to the support 106. The jaws are provided with respective jaw plates. They bear against the support 106 via guide skids. Their back stroke is limited by studs 115 engaged in the support 106.

A mechanism for vertically displacing the extractor 100 comprises an electric motor 118 carried by the lower bracket 82 and having a outlet shaft carrying a gear wheel 120 (FIG. 7). By means of a toothed belt 122, the gear wheel drives a toothed pulley wheel 124 fixed to a drive screw 126 secured against longitudinal movement on the lower bracket 82 by two bearings 128. Under the protection of a bellows 130, the screw 126 carries a nut 132 which is fixed to the motion-transmitting bracket 102 and which is thus prevented from rotating.

The level of the extractor is given by a measurement system which, in the example shown in FIG. 7, includes a sensor 134 fixed to the motion-transmitting bracket 102 and provided with a reference fork 133 that moves relative to a graduated scale 136 fixed to the lower bracket 82. Advantageously, the position of the fork is adjustable, e.g., by means of an adjustment screw 138.

The cap-removing assembly further comprises pneumatic ejection means for ejecting the caps removed by the jaws. In the example shown in FIG. 7, these means are constituted by a row of nozzles 140 fed by a manifold 142 fixed to the upper bearing 128.

The mechanism for opening and closing the jaws 108 and 110 is shown in FIGS. 8 and 9. It comprises a linear actuator 143 whose rod has a terminal fork coupled by a pin 144 to two arms 146. These arms are connected to the levers 112 by means of respective pins 148. Two proximity sensors 150 fixed on the support 106 serve to determine the position of a tab 152 which is fixed to the terminal fork of the actuator rod, thereby indicating the closed or open state of the jaws. In FIG. 8, the tab 152 is shown facing the proximity detector that indicates that the jaws are opened.

Finally, the extender 104 carries a cap-receiving tank 154 provided with a downwards feed hopper 105 situated facing the opening between the jaws. The tank is removable to enable ejected caps to be recovered. It is normally held in place by locks 156.

The method of installing rods by means of apparatus of the kind described above is as follows, once an empty skeleton 20 without its end-fittings has been placed on the bench 22 facing a magazine 24 which contains rods in alignment with each of the rod-receiving places in the skeleton.

When the apparatus is in its initial state, the pull bars of the mechanism 26 are fully retracted. The extractor 00 is in its higher position with its jaws open. Its level is adjusted so that the gap between the jaws faces the first layer of cells to be loaded. The level of the extractor can be adjusted automatically by energizing the motor 118 in an upward direction, starting from the bottom position of the extractor, until the level sensor 134 reaches a predetermined graduation on the scale 136. The mechanism 26 is adjusted in such a manner that the pull bars it carries are in alignment with the layer of rods to be inserted.

A receptacle 42 whose grid has been filled with caps is placed on the fixed support 36, the actuator 66 being controlled so that the moving plate 60 remains in the position where it prevents the caps from moving out of the receptacle.

The pull bars are then advanced with their clamps closed until the clamps (chain-dotted lines in FIG. 6) are pushed fully home inside the caps 56, whose conical ends are retained by the moving plate 60. The actuator 66 is then energized to displace the moving plate diagonally through half a pitch size, thereby allowing the caps 56 to pass through. To facilitate displacement of the moving plate 60, the pull bars may previously be slightly moved back to prevent the cap from rubbing.

After the moving plate has been moved, the pull bars are advanced through the grids of the skeleton. The caps flex away the springs of the grids in the skeleton and avoid any danger of catching and of permanent deformation.

The pull bars are thus advanced until the caps have passed through all of the grids, and have come out of the skeleton, after passing through guide holes (not shown) formed through the vertical wall of the upper bracket 88, so that the caps come between the jaws 108 and 110.

Forward motion is then stopped. The actuator 142 is powered to clamp the caps between the jaws and to hold them.

The pull bars are then moved back until they are disengaged from the jaws and from the upper bracket 88. The motor 118 is actuated to lower the extractor to the position shown in chain-dotted lines in FIG. 7, where the caps face the nozzles 140. The jaws are opened, e.g., by de-energizing the actuator 143, and the nozzles are fed with compressed air to eject the caps into the recovery tank 104 via the hopper 105.

As soon as the extractor has moved down far enough to clear the path of the pull bars, the end clamps can be opened and the pull bars can be moved forwardly until the clamps engage the terminal plugs of the fuel rods. The clamps are then closed again. The pull bars can then be moved backwards so as to draw a layer of fuel rods through the grids. Once the fuel rods are in place, the clamps are opened. The mechanism moves the pull bars further back until they have cleared the cap-placing assembly.

A new sequence of loading a layer of fuel rods can then be started, once the clamps of the pull bars have been closed again, the moving plate 60 returned to the position in which it holds the caps, and the extractor 100 and the pull bars moved through one step vertically so as to load another layer.

When a layer includes locations for guide tubes, the corresponding pull bars are disconnected from the longitudinal displacement mechanism.

Finally, when all of the rods are in place, the assembly is completed by securing the lower end nozzle and the upper end nozzle.

We claim:

1. Apparatus for installing fuel rods in a nuclear fuel assembly skeleton, defining fuel rod locations distributed in a predetermined array, said apparatus comprising:
    fixed skeleton receiving means for receiving a skeleton devoid of end nozzles;
    a magazine for storing fuel rods in alignment with said locations in the skeleton placed on a longitudinal side of said receiving means;
    a longitudinal displacement mechanism located on the other longitudinal side of said receiving means, said displacement mechanism having a plurality of mutually parallel pull bars and means for displacing said pull bars longitudinally towards the magazine and away from the magazine, the pull bars being terminated by clamps for grasping a plurality of fuel rods to be inserted into said skeleton;
    a cap-placing assembly interposed between the skeleton receiving means and the longitudinal displacement mechanism, said cap-placing assembly having a fixed support and a removable receptacle formed with housing distributed in an array that reproduces said array of fuel rod locations; and,
    a plurality of caps adapted to be received each in one of said housings, the shape of the caps being such that they are adapted to fit over the clamps of the pull bars when the clamps are closed nd the pull bars are moved forwardly toward the magazine.

2. Apparatus according to claim 1, wherein the removable receptacle comprises a perforated body arranged to be secured to the support, passages formed through the body and distributed in an array identical to said array of fuel rods, and a closure plate formed with holes that holds captive a grid formed with housings for receiving said caps.

3. Apparatus according to claim 2, wherein the removable receptacle further comprises a perforated backing plate co-operating with the body to define a passage for receiving a moving plate between a position in which holes thereof coincide with the housings and a position in which said holes are offset relative to the housings thereby preventing the caps from moving out of the receptacle.

4. Apparatus according to claim 3, wherein the moving plate is provided with guide means and is connected to an actuator for displacement in a direction at 45° to the rows of housings.

5. Apparatus according to claim 1, further including a cap-removing assembly interposed between the skeleton-receiving means and the magazine, the cap-removing assembly having a frame carrying cap-retaining jaws that are displaceable transversely to the displacement direction of the pull bars between a position in which they engage at least some of the caps and a position in which they release said caps.

6. Apparatus according to claim 5, wherein the frame is displaceable transversely to the direction of the pull bars to allow the pull bars to pass, and to enable the clamps to advance to grasp rods placed in the magazine.

7. Apparatus according to claim 5, wherein the frame is mounted on fixed brackets so as to be vertically movable and is connected to the brackets by vertical displacement means enabling the frame to be brought to a level where the jaws vertically straddle followed by the pull bars through any one of the rows of housings.

8. Apparatus according to claim 7, wherein the jaws are designed to engage simultaneously all caps in a same row.

9. Apparatus according to claim 7, wherein the vertical displacement means are designed to bring the frame to a level where the jaws face pressurized air nozzles for ejecting the caps.

10. Apparatus according to claim 5, wherein the frame carries a cap-collecting tank.

11. A method of installing fuel rods in a skeleton of a nuclear fuel assembly, comprising the steps of:
    placing a skeleton devoid of end nozzles horizontally between a storage magazine for storing rods in alignment with rod-receiving locations in the skeleton and a longitudinal displacement mechanism for displacing pull bars terminated by rod-grasping clamps towards the magazine and away from the magazine;
    passing said pull bars through the skeleton until they reach the magazine and grasping respective rods; and
    pulling said pull rods through the skeleton;
    further comprising the steps of:
    loading caps in housings in a receptacle, said housings being distributed in the same array as the rods;
    locating the receptacle between the displacement mechanism and the skeleton;
    moving the pull bars forwardly to engage the clamps in the caps as they pass through the receptacle and prior to going through the skeleton; and
    removing the caps when they leave the receptacle without manual intervention prior to moving the clamps up to the magazine.

12. A method according to claim 11, comprising the further steps of: moving the clamps between open jaws; clamping the jaws onto the caps; moving back the pull bars to disengage them from the jaws; lowering and opening the jaws; moving the pull bars forwardly again until the clamps engage terminal plugs of the fuel rods, closing the clamps, and simultaneously pulling all rods of a layer through the skeleton.

13. A method according to claim 11, wherein said loading step is carried out at a location remote from said magazine.

* * * * *